(12) United States Patent
Russ

(10) Patent No.: US 7,416,392 B2
(45) Date of Patent: Aug. 26, 2008

(54) STOW ABORT MECHANISM FOR A RAM AIR TURBINE

(75) Inventor: David E. Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 529 days.

(21) Appl. No.: 11/221,105

(22) Filed: Sep. 7, 2005

(65) Prior Publication Data

US 2007/0237640 A1    Oct. 11, 2007

(51) Int. Cl.
*F03D 11/04* (2006.01)
(52) U.S. Cl. ..................................... 416/142
(58) Field of Classification Search ................ 416/142, 416/20 R, 23, 143; 403/324, 325, 222.1; 244/58; 415/126; 74/526
See application file for complete search history.

(56) References Cited

U.S. PATENT DOCUMENTS

| 4,717,095 A | * | 1/1988 | Cohen et al. | 244/58 |
| 4,742,976 A | * | 5/1988 | Cohen | 244/58 |
| 4,743,163 A | | 5/1988 | Markunas et al. | |
| 5,123,614 A | * | 6/1992 | Whitehouse | 244/58 |
| 5,398,780 A | * | 3/1995 | Althof et al. | 185/39 |

* cited by examiner

*Primary Examiner*—Ninh Nguyen
*Assistant Examiner*—Aaron R Eastman
(74) *Attorney, Agent, or Firm*—Stephen G. Mican

(57) ABSTRACT

A stow abort mechanism for a ram air turbine (RAT) with a strut that rotates a turbine with associated blades from a stowed position to a deployment condition comprises a stow abort lock plate with an aperture that rotates with the strut and a stow abort lock pin that engages the aperture in the stow abort lock plate when the blades do not align properly for rotating the strut back into the stowed position.

24 Claims, 8 Drawing Sheets

STOW ABORT MECHANISM FOR A RAM AIR TURBINE

FIELD OF THE INVENTION

The invention relates to emergency supplemental power supplies for aeronautical applications, and more particularly to an improved ram air turbine for generating emergency supplemental power for aircraft in flight.

BACKGROUND OF THE INVENTION

A ram air turbine (RAT) is a device for generating emergency supplemental power in a wide variety of aircraft. A RAT may generate hydraulic power, electric power or both. A RAT incorporates a turbine that extracts power from an air stream proximate the aircraft in flight. A typical RAT in current use is described in U.S. Pat. No. 4,743,163 to Markunas et al., owned by the assignee of this application, and incorporated herein by reference. The turbine is coupled to suitable power generating equipment, such as a hydraulic pump for hydraulic power and an electric generator for electric power, or both in the case of a hybrid RAT.

The general operation of a RAT requires that it rotate from a stored position to a deployment position in an air stream. The rotating portion of the RAT comprises an air stream-powered turbine, lower gearbox and strut. The stationary portion of the RAT comprises a RAT frame and a pivot post that has journal bearings in which the strut rotates. The storage for the RAT is typically within a RAT bay behind a RAT bay door. The RAT must only start rotating after it achieves adequate clearance from the RAT bay door so that its blades may rotate freely. The blades are locked until a release mechanism allows the blades to rotate. The release mechanism usually comprises a turbine release cable coupled to a turbine release cable lever on one end and a turbine release pin on the other. The turbine release pin passes through an aperture in the turbine driveshaft when the RAT is in the stowed position to lock the blades whilst stowed. As the RAT rotates out of the RAT bay, the turbine release lever rotates with it until it hits a stop pin. Since the turbine release lever then remains motionless as the RAT continues to rotate into its deployment position, the turbine release cable to which it attaches pulls the turbine release pin out of the aperture in the turbine driveshaft so that the blades are free to rotate.

When the RAT is ready to be re-stowed into the RAT bay, the blades must align in position so that they can return through the RAT bay door. Misalignment of the blades can cause them to contact the door and damage can result. A stow abort mechanism can prevent such damage by inhibiting RAT stowage when the blades are misaligned.

The common stow abort mechanism generally comprises a turbine release cable sensing system that comprises an electronic switch with an associated electrical wiring harness and stow panel logic circuitry rigged to sense misalignment of the blades based upon the position of the turbine release cable. That is, if the blades are misaligned, the turbine release pin fails to re-insert itself into the turbine drive shaft, thereby forcing the turbine release cable against the turbine release cable lever and thereby displacing the turbine release cable lever away from the stop. This activates the electronic switch and the stow abort mechanism inhibits the stow operation. The problem with this type of stow abort system is that the switch, rigging, electrical harness and stow panel logic circuitry are somewhat costly. A simpler and less expensive approach is desirable.

SUMMARY OF THE INVENTION

A special lock plate with an aperture there through mounted to the RAT strut rotates along with the turbine release cable lever as the RAT rotates out of the RAT bay. A spring-loaded stow abort lock pin replaces the stop that inhibits rotation of the turbine release cable lever as the RAT approaches its deployment position. The stow abort lock pin normally slides along the surface of the lock plate. As the aperture of the lock plate approaches the stow abort lock pin, the turbine cable release lever engages a shoulder of the stow abort lock pin so that it cannot slide into the lock plate aperture and terminate the deployment of the RAT. At the same time, the stow abort lock pin acts as a stop for the turbine release cable lever so that the turbine release cable can pull the turbine release pin out of the turbine driveshaft as the RAT continues to rotate into its deployment position, thereby allowing the turbine blades to rotate due to an impending air stream. If upon re-stowing the RAT the blades are misaligned, the turbine release pin does not engage the turbine drive shaft, thereby pushing the turbine release cable toward the turbine cable release lever so that the turbine cable release lever disengages from the shoulder of the abort pin. As the RAT begins to rotate back into its stowage position, the stow abort lock pin drops into the aperture in the lock plate, thereby terminating the stow process.

In a possible embodiment of the invention or a RAT that comprises a rotating portion comprising an air stream-powered turbine with associated blades and driveshaft, a lower gearbox and strut and a stationary portion comprising a RAT frame and a pivot post that has journal bearings in which the strut rotates between a stowed position and a deployment position, the invention comprises a stow abort mechanism for preventing the strut from rotating from the deployment position to the stowed position when the blades are not properly aligned, comprising: a stow abort lock plate with an aperture that rotates with the strut; and a stow abort lock pin that engages the lock plate aperture when the blades are not properly aligned for returning the rotating portion of the RAT to the stowed position.

DETAILED DESCRIPTION OF THE INVENTION

Figure 1:
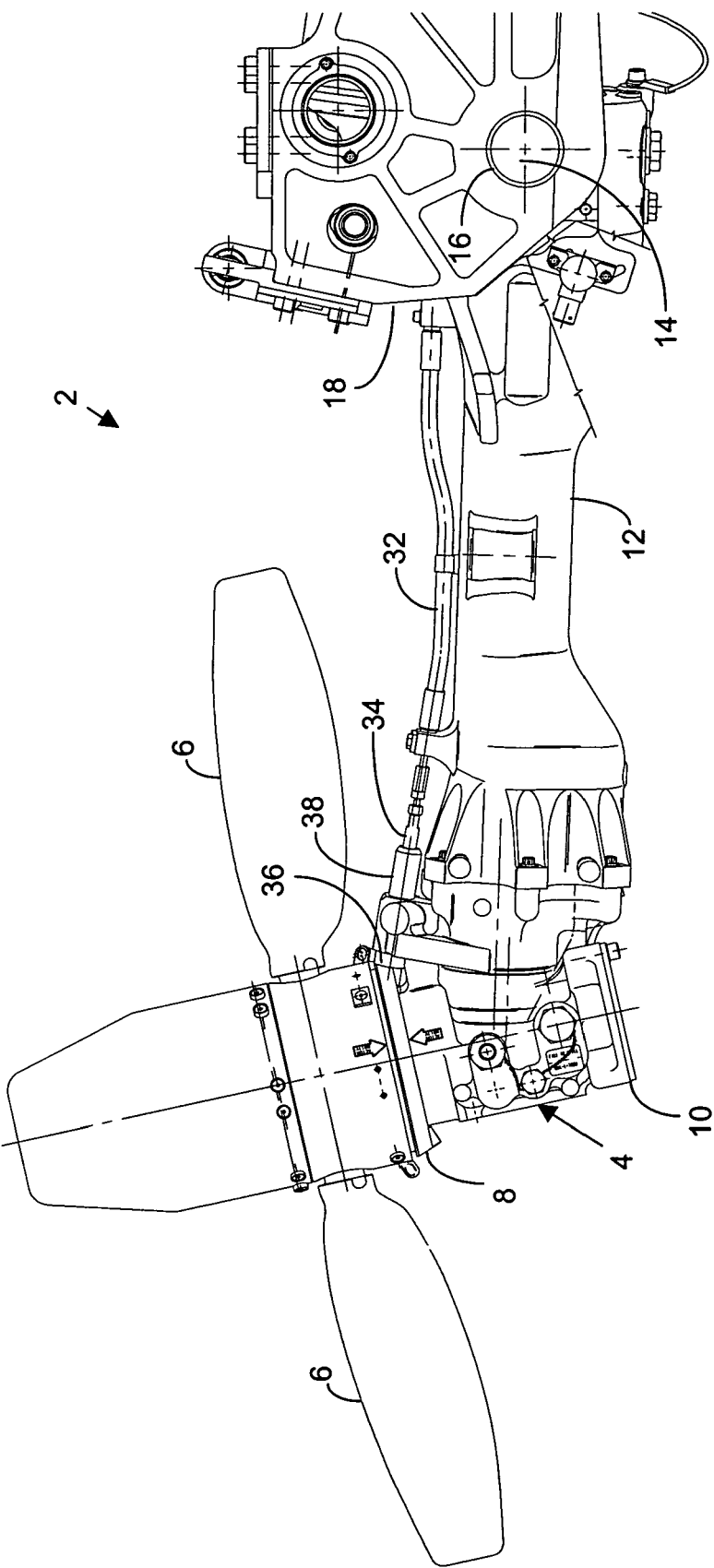
FIG. 1 is a side view of a RAT according to a possible embodiment of the invention in a stowed position.
Figure 2:
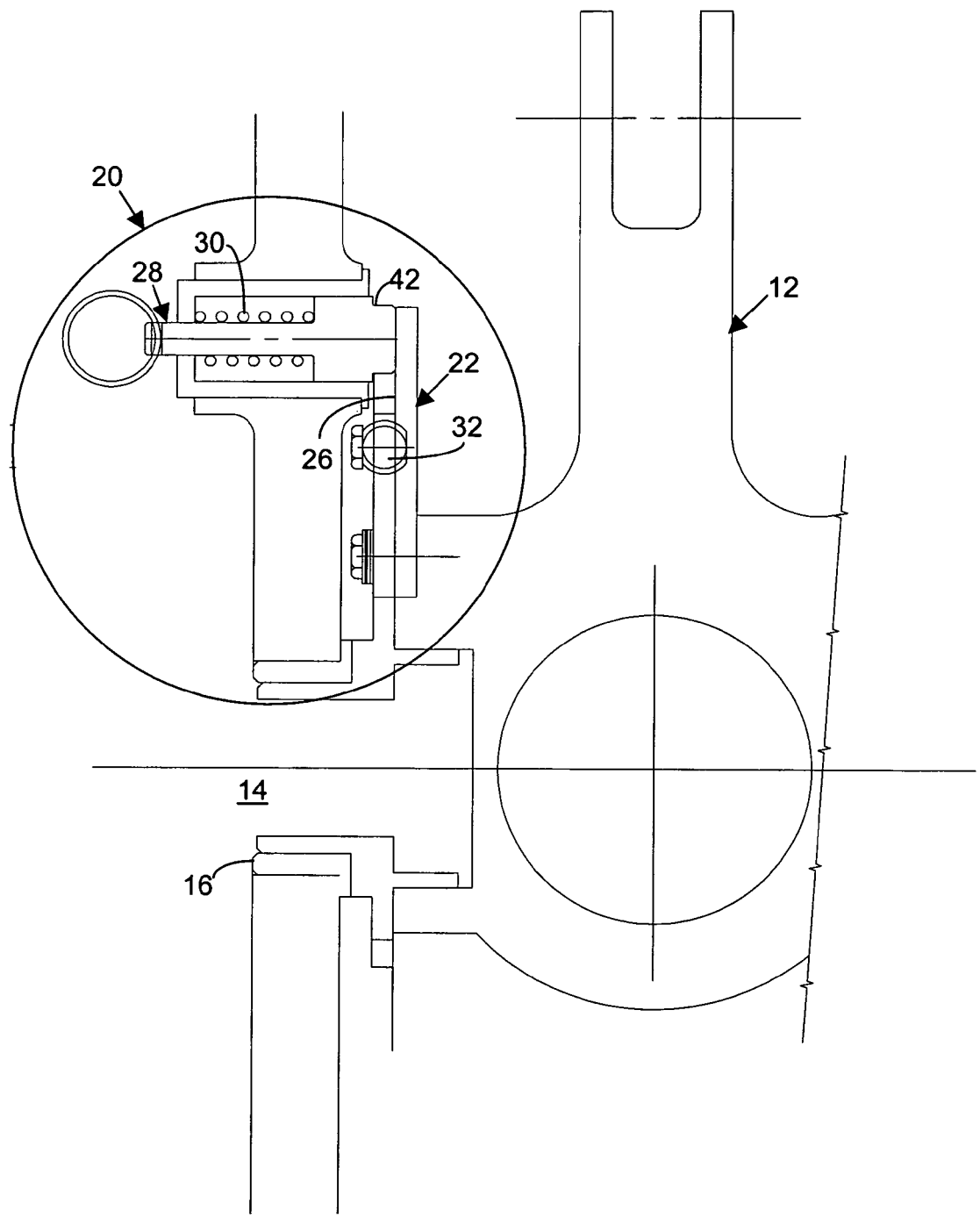
FIG. 2 is a cut-away partial end view of a stow abort mechanism according to a possible embodiment of the invention.
Figure 3:
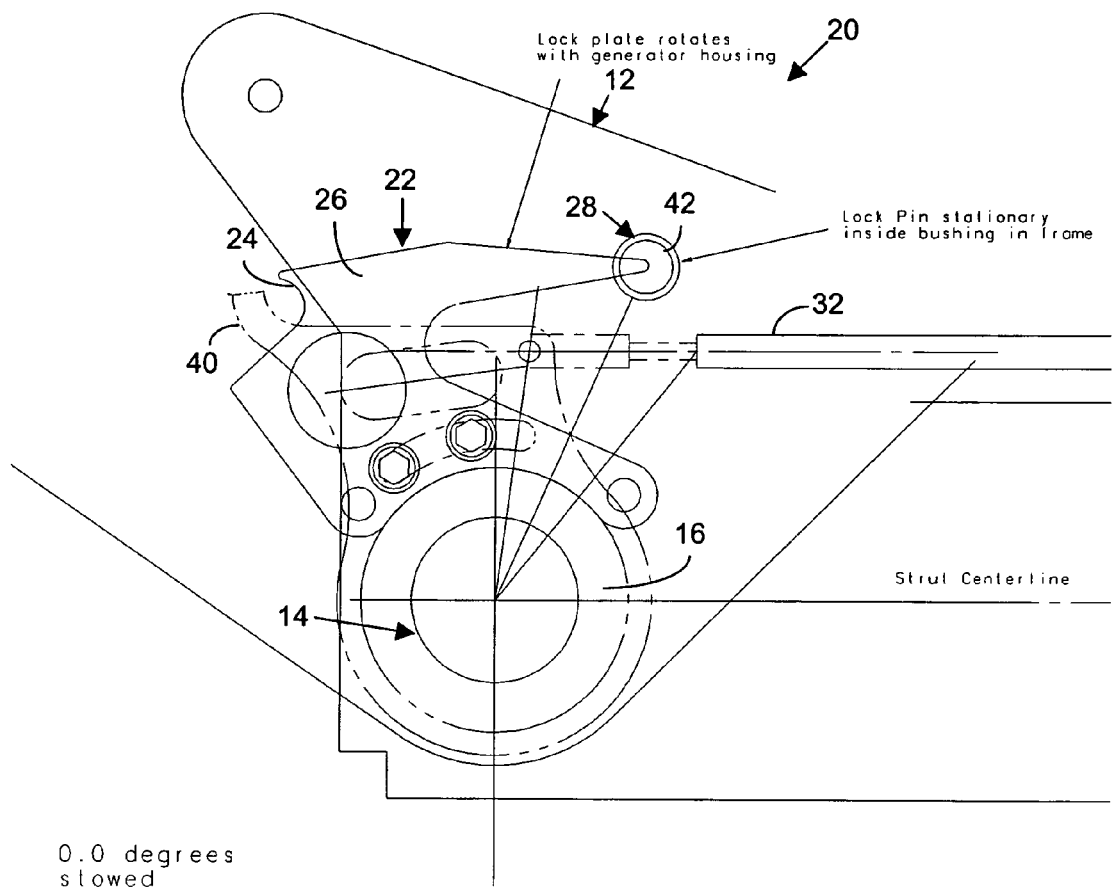
FIG. 3 is a side view of the stow abort mechanism according to the invention with the RAT in a stowed position.

FIG. 1 is a cut-away side view of a RAT 2 according to one possible embodiment of the invention in a stowed position. The RAT 2 has a turbine 4 with turbine blades 6 that rotate about a turbine driveshaft 8 coupled to a lower gear box 10. The turbine 4 and lower gear box 10 mounts on a RAT strut 12 that rotates on a pivot post 14 within journal bearings 16, which are mounted in a RAT frame 18. FIG. 2 shows a cut-away end view of a possible embodiment of a stow abort mechanism 20 with the RAT 2. FIG. 3 shows a side view of the stow abort mechanism shown in FIG. 2 in a stowed position. The stow abort mechanism 20 comprises a lock plate 22 that rotates with the RAT strut 12. The lock plate 22 has an aperture 24 and a sliding surface 26. The aperture may comprise any convenient shape along the sliding surface 26, such as a hole, an indentation, or a slot along a side of the sliding surface 26 as shown. The stow abort mechanism 20 also comprises a stow abort lock pin 28 that contacts the sliding surface 26. As shown by comparing FIGS. 3 and FIG. 4, the stow abort lock pin 28 slides along the sliding surface 26 of the lock plate 22 as it starts to rotate with the RAT strut 12 into a normal deployment position. The stow abort mechanism 20 may also comprise a lock pin biasing device 30, such as a compression spring, to conveniently keep the stow abort lock pin 28 in contact with the sliding surface 26 as the lock plate 22 rotates.

A turbine release cable 32 has one end fastened to a turbine release pin 34 that engages the turbine driveshaft 8 by way of a driveshaft aperture 36, such as a hole, indentation or slot as shown. A turbine release pin biasing device 38, such as a compression spring, conveniently keeps the turbine release pin 34 engaged with the driveshaft aperture 36 in the turbine driveshaft 8. Another end of the turbine release cable 32 attaches to a turbine release cable lever 40. As the RAT strut 12 rotates toward its normal deployment position, the turbine release pin cable 32 pulls the turbine release cable lever 40 to rotate along with the lock plate 22.

Figure 4:
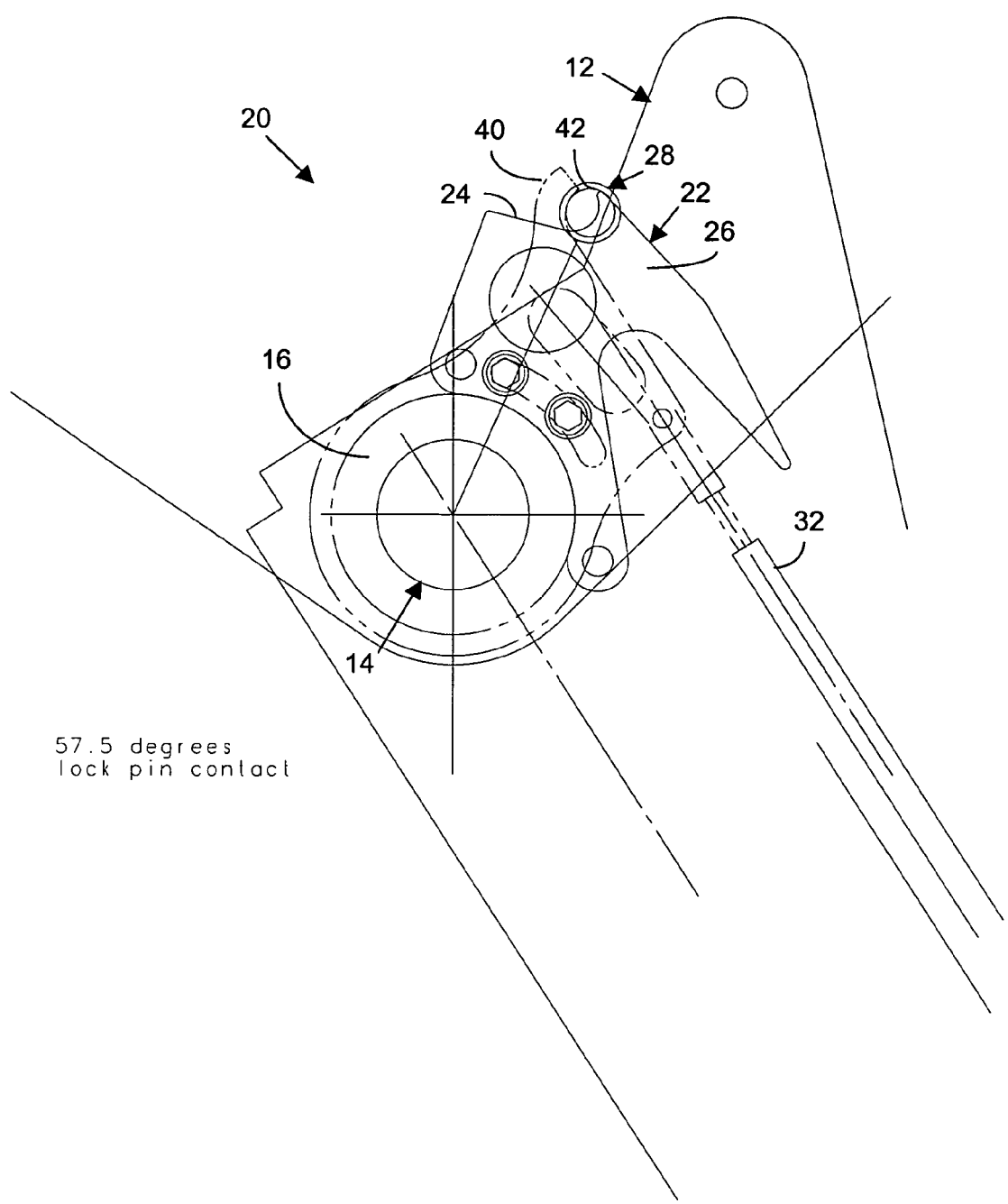
FIG. 4 is a side view of the stow abort mechanism according to the invention with the RAT starting to rotate into a normal deployment position.
Figure 5:
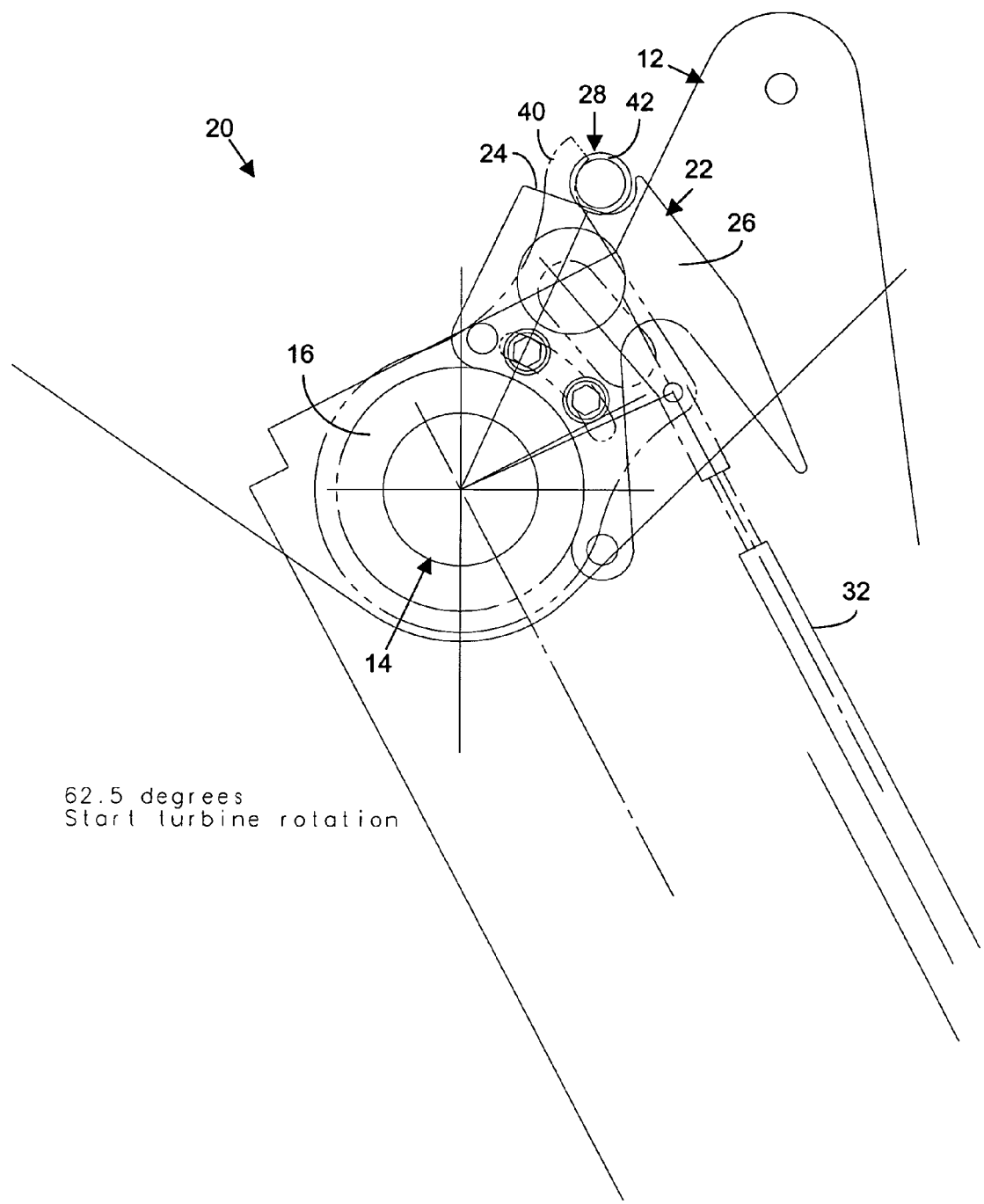
FIG. 5 is a side view of the stow abort mechanism according to the invention with the RAT nearly rotated into its normal deployment position.

Referring to FIG. 4, as the RAT strut 12 continues to rotate toward its deployment position, the turbine release cable lever 40 approaches the stow abort lock pin 28 and it engages a shoulder 42 on the stow abort lock pin 28. The stow abort lock pin 28 stops further rotation of the turbine release cable lever 40 as the turbine release cable 32 pulls on it. As a result, the turbine release cable 32 pulls the turbine release pin 34 out of its position in the turbine driveshaft aperture 36, thereby allowing the blades 6 of the turbine 4 to rotate as shown in FIG. 5. As the RAT strut 12 continues to rotate toward its deployment position, the lock plate aperture 24 passes under the stow abort lock pin 28. The engagement of the turbine release cable lever 40 with the shoulder 42 of the stow abort lock pin 28 prevents it from engaging the lock plate aperture 24.

Figure 6:
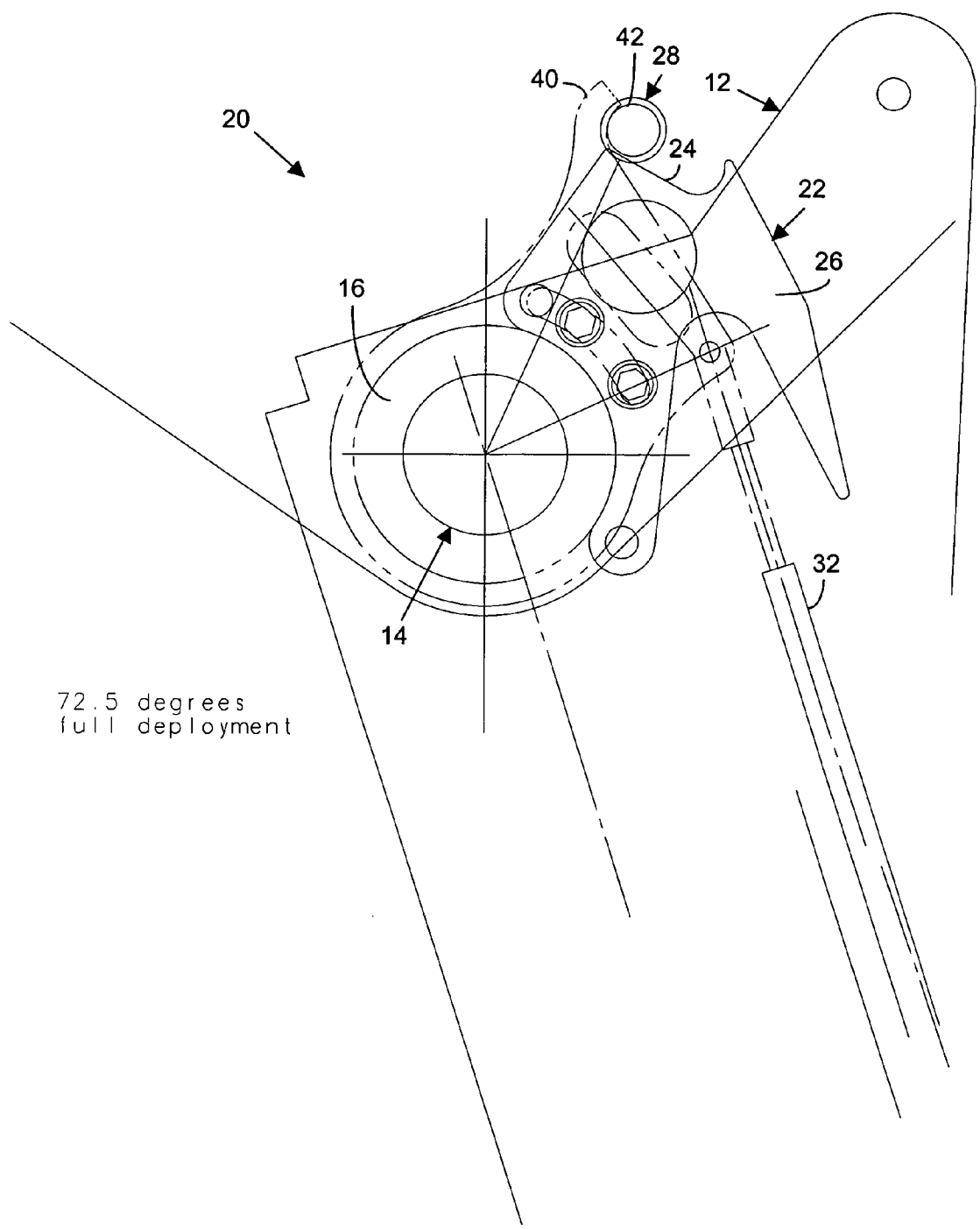
FIG. 6 is a side view of the stow abort mechanism according to the invention with the RAT rotated into its normal deployment position.

Referring to FIG. 6, as the RAT strut 12 reaches its deployment position, the stow abort mechanism 20 has allowed the turbine release pin 34 to remain disengaged from the turbine driveshaft aperture 36 so that the turbine blades 6 may rotate freely during operation of the RAT 2. Therefore, the RAT 2 is free to operate in its fully deployed position.

When the RAT 2 is ready to be restowed, the RAT strut 12 starts to rotate back toward its stowed position. If the turbine blades 6 align properly for restowage, the turbine release pin 34 is free to reengage the turbine driveshaft aperture 36. Consequently, the turbine cable release lever 40 remains engaged with the shoulder 42 of the stow abort lock pin 28 as the lock plate 22 rotates along with the RAT strut 12. The turbine release cable 32 does not begin to push the turbine cable release lever 40 away from the stow abort lock pin 28 to disengage from its shoulder 42 until the lock plate aperture 24 rotates past the position of the stow abort lock pin 28. Thus, the stow abort lock pin 28 contacts the sliding surface 26 of the lock plate 22 without dropping into the lock plate aperture 24.

Figure 7:
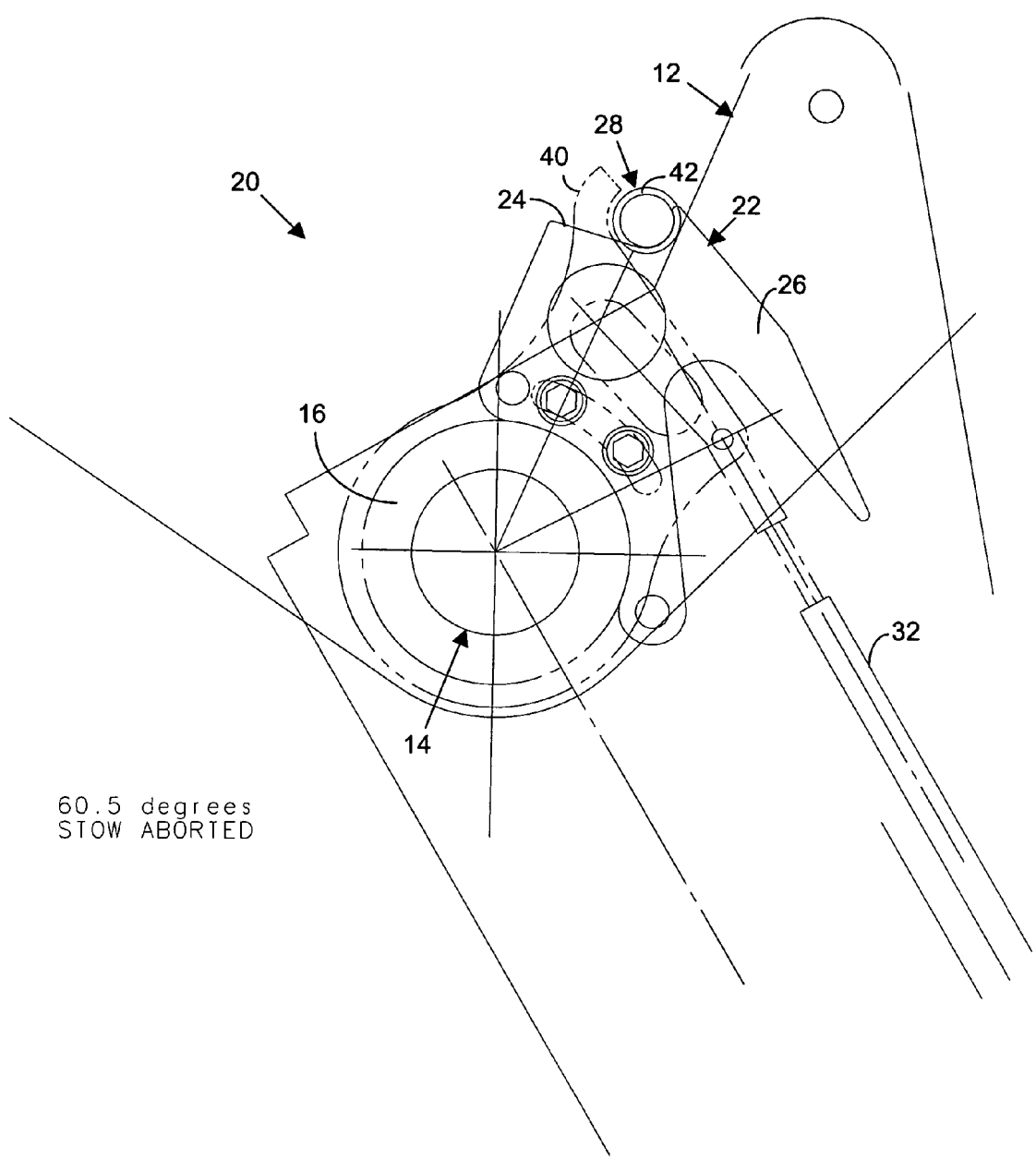
FIG. 7 is a side view of the stow abort mechanism according to the invention with the RAT starting to rotate back into its stowed position with its blades incorrectly positioned and the stow abort mechanism engaged.

However, if the turbine blades 6 do not align properly for restowage, the turbine release pin 34 cannot engage the turbine drive shaft aperture 36. Referring to FIG. 7, the turbine release cable 32 pushes the turbine cable release lever 40 to disengage it from the shoulder 42 of the stow abort lock pin 28 as the RAT strut 12 starts to rotate back to its stowed position. The lock plate 22 also rotates, but in this case its rotation is not sufficient to let the lock plate aperture 24 clear the stow abort lock pin 28. Therefore, when the turbine cable release lever 40 disengages from the shoulder 42 of the stow abort lock pin 28, the stow abort lock pin 28 drops into the lock plate aperture 24, thereby blocking the RAT strut 12 from further rotation and aborting the stow operation of the RAT 2.

Figure 8:
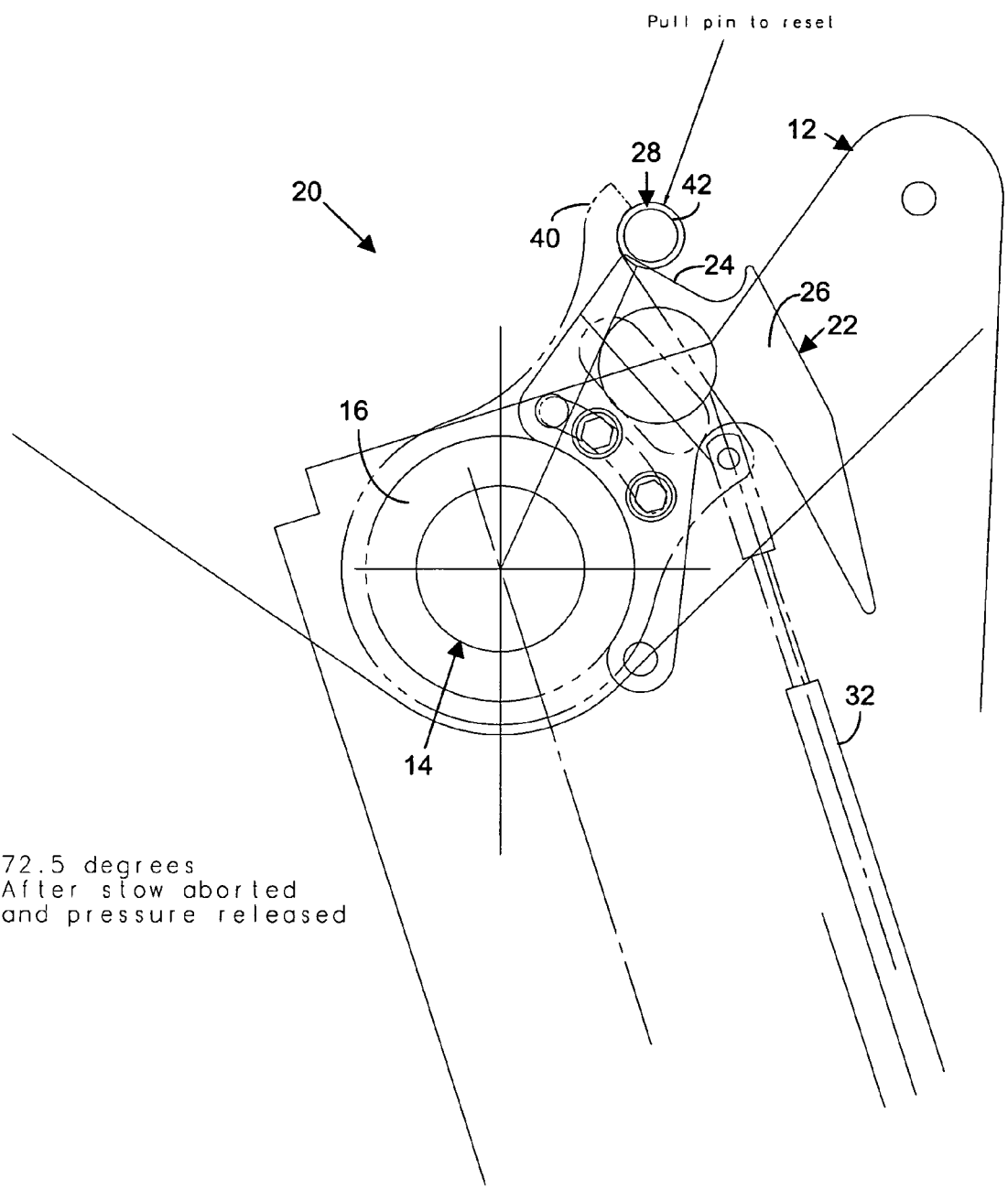
FIG. 8 is a side view of the stow abort mechanism according to the invention with the RAT rotated back into its fully deployed position prior to reset of its stow abort pin.

Referring to FIG. 8, when the RAT strut 12 is reset to its deployment position, the stow abort lock pin 28 may be pulled outward against its biasing device 30. The biasing device 38 for the turbine release pin 34 pulls on the turbine release cable lever 40 by way of the turbine release cable 32 to reengage the shoulder 42 of the stow abort lock pin 28 so that a new stow operation may initiate.

Described above is a stow abort mechanism for a RAT with a strut that rotates a turbine with associated blades from a stowed position to a deployment condition that comprises a stow abort lock plate with an aperture that rotates with the strut and a stow abort lock pin that engages the aperture in the stow abort lock plate when the blades do not align properly for rotating the strut back into the stowed position. It should be understood that this embodiment is only an illustrative implementation of the invention, that the various parts and arrangement thereof may be changed or substituted, and that the invention is only limited by the scope of the attached claims.

What is claimed is:

1. A ram air turbine (RAT) that comprises a rotating portion comprising an air stream-powered turbine with associated blades and driveshaft, a lower gearbox and strut and a stationary portion comprising a RAT frame and a pivot post that has journal bearings in which the strut rotates between a stowed position and a deployment position, a stow abort mechanism for preventing the strut from rotating from the deployment position to the stowed position when the blades are not properly aligned, comprising:

a stow abort lock plate with an aperture that rotates with the strut; and a stow abort lock pin that engages the lock plate aperture when the blades are not properly aligned for returning the rotating portion of the RAT to the stowed position.

2. The stow abort mechanism of claim 1, wherein the driveshaft has an aperture therein and the RAT further comprises a turbine release pin that engages the driveshaft aperture when the strut is in the stowed position, a turbine release lever and a turbine release cable that connects the turbine release pin to the turbine release cable lever, further comprising:

a shoulder on the stow abort lock pin that engages the turbine release lever when the turbine release cable pulls the turbine release cable lever against the stow abort lock pin as the strut rotates from the stowed position to the deployment position to prevent further movement of the turbine release cable lever and to prevent the stow abort lock pin from engaging the lock plate aperture as the lock plate rotates with the strut into the deployment position; and a stow abort lock pin biasing device that pushes the stow abort lock pin against a sliding surface of the lock plate to engage the lock plate aperture when the strut rotates from the deployment position to the stowed position and the turbine release pin is not engaged in the driveshaft aperture.

3. The stow abort mechanism of claim 2, wherein the turbine release pin forces the turbine release cable to disengage the turbine release cable lever from the shoulder of the stow abort lock pin when the turbine release pin does not engage the driveshaft aperture due to misalignment of the blades upon moving the strut from the deployment position to the stow position.

4. The stow abort mechanism of claim 2, wherein the engagement of the turbine release cable lever with the shoulder of the stow abort lock pin causes the turbine release pin to disengage from the driveshaft aperture upon further rotation of the strut from the stowed position to the deployment position.

5. The stow abort mechanism of claim 2, wherein the stow abort lock pin biasing device comprises a compression spring.

6. The stow abort mechanism of claim 1, wherein the lock plate aperture comprises a hole in the lock plate.

7. The stow abort mechanism of claim 1, wherein the lock plate aperture comprises an indentation in the lock plate.

8. The stow abort mechanism of claim 1, wherein the lock plate aperture comprises a slot in the lock plate.

9. A ram air turbine (RAT) that comprises a rotating portion comprising an air stream-powered turbine with associated blades and driveshaft with an aperture therein, a lower gearbox, a strut, a turbine release pin that engages the driveshaft aperture when the strut is in the stowed position, a turbine release lever and a turbine release cable that connects the turbine release pin to the turbine release cable lever, and a stationary portion comprising a RAT frame and a pivot post that has journal bearings in which the strut rotates between a stowed position and a deployment position, a stow abort mechanism for preventing the strut from rotating from the deployment position to the stowed position when the blades are not properly aligned, comprising:

a stow abort lock plate with an aperture that rotates with the strut; and a stow abort lock pin that engages the turbine release cable lever to cause the turbine release cable to pull the turbine release pin out of the driveshaft aperture as the strut rotates into the deployment position and that engages the lock plate aperture when the blades are not properly aligned for returning the rotating portion of the RAT to the stowed position.

10. The stow abort mechanism of claim 9, further comprising:

a shoulder on the stow abort lock pin that engages the turbine release lever when the turbine release cable pulls the turbine release cable lever against the stow abort lock pin as the strut rotates from the stowed position to the deployment position to prevent further movement of the turbine release cable lever and to prevent the stow abort lock pin from engaging the lock plate aperture as the lock plate rotates with the strut into the deployment position; and a stow abort lock pin biasing device that pushes the stow abort lock pin against a sliding surface of the lock plate to engage the lock plate aperture when the strut rotates from the deployment position to the stowed position and the turbine release pin is not engaged in the driveshaft aperture.

11. The stow abort mechanism of claim 10, wherein the turbine release pin forces the turbine release cable to disengage the turbine release cable lever from the shoulder of the stow abort lock pin when the turbine release pin does not engage the driveshaft aperture due to misalignment of the blades upon moving the strut from the deployment position to the stow position.

12. The stow abort mechanism of claim 10, wherein the engagement of the turbine release cable lever with the shoulder of the stow abort lock pin causes the turbine release pin to disengage from the driveshaft aperture upon further rotation of the strut from the stowed position to the deployment position.

13. The stow abort mechanism of claim 10, wherein the stow abort lock pin biasing device comprises a compression spring.

14. The stow abort mechanism of claim 9, wherein the lock plate aperture comprises a hole in the lock plate.

15. The stow abort mechanism of claim 9, wherein the lock plate aperture comprises an indentation in the lock plate.

16. The stow abort mechanism of claim 9, wherein the lock plate aperture comprises a slot in the lock plate.

17. A ram air turbine (RAT) with a stow abort feature, comprising:

a rotating portion comprising an air stream-powered turbine with associated blades and driveshaft with an aperture therein, a lower gearbox, a strut, a turbine release pin that engages the driveshaft aperture when the strut is in the stowed position, a turbine release lever, a turbine release cable that connects the turbine release pin to the turbine release cable lever and a stow abort lock plate with an aperture that rotates with the strut; and a stationary portion comprising a RAT frame, a pivot post that has journal bearings in which the strut rotates between a stowed position and a deployment position and a stow abort lock pin that engages the turbine release cable lever to cause the turbine release cable to pull the turbine release pin out of the driveshaft aperture as the strut rotates into the deployment position and that engages the lock plate aperture when the blades are not properly aligned for returning the rotating portion of the RAT to the stowed position.

18. The RAT of claim 17, further comprising:

a shoulder on the stow abort lock pin that engages the turbine release lever when the turbine release cable pulls the turbine release cable lever against the stow abort lock pin as the strut rotates from the stowed position to the deployment position to prevent further movement of the turbine release cable lever and to prevent the stow abort lock pin from engaging the lock plate aperture as the lock plate rotates with the strut into the deployment position; and a stow abort lock pin biasing device that pushes the stow abort lock pin against a sliding surface of the lock plate to engage the lock plate aperture when the strut rotates from the deployment position to the stowed position and the turbine release pin is not engaged in the driveshaft aperture.

19. The RAT of claim 18, wherein the turbine release pin forces the turbine release cable to disengage the turbine release cable lever from the shoulder of the stow abort lock pin when the turbine release pin does not engage the driveshaft aperture due to misalignment of the blades upon moving the strut from the deployment position to the stow position.

20. The RAT of claim 18, wherein the engagement of the turbine release cable lever with the shoulder of the stow abort lock pin causes the turbine release pin to disengage from the driveshaft aperture upon further rotation of the strut from the stowed position to the deployment position.

21. The RAT of claim 18, wherein the stow abort lock pin biasing device comprises a compression spring.

22. The RAT of claim 17, wherein the lock plate aperture comprises a hole in the lock plate.

23. The RAT of claim 17, wherein the lock plate aperture comprises an indentation in the lock plate.

24. The RAT of claim 17, wherein the lock plate aperture comprises a slot in the lock plate.

* * * * *